United States Patent
Winsor

(10) Patent No.: US 8,615,989 B2
(45) Date of Patent: Dec. 31, 2013

(54) METHOD FOR REGENERATION OF DIESEL PARTICULATE FILTER IN AN EXHAUST AFTERTREATMENT SYSTEM OF AN IC ENGINE

(75) Inventor: Richard E. Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 543 days.

(21) Appl. No.: 12/692,969

(22) Filed: Jan. 25, 2010

(65) Prior Publication Data

US 2011/0179771 A1    Jul. 28, 2011

(51) Int. Cl.
*F01N 3/00* (2006.01)

(52) U.S. Cl.
USPC ............... 60/295; 60/285; 60/286; 60/297; 60/273

(58) Field of Classification Search
USPC .................... 60/285, 286, 295, 297
See application file for complete search history.

(56) References Cited

U.S. PATENT DOCUMENTS

| | | | |
|---|---|---|---|
| 5,595,060 A * | 1/1997 | Togai et al. | 60/274 |
| 6,263,666 B1 * | 7/2001 | Kubo et al. | 60/277 |
| 6,901,747 B2 | 6/2005 | Tashiro et al. | |
| 2002/0157386 A1 * | 10/2002 | Hiranuma et al. | 60/295 |
| 2004/0144069 A1 | 7/2004 | Gabe et al. | |
| 2004/0221571 A1 * | 11/2004 | Lewis et al. | 60/277 |
| 2005/0145233 A1 * | 7/2005 | Schneider et al. | 123/690 |
| 2006/0201144 A1 * | 9/2006 | Gabe et al. | 60/299 |
| 2007/0084442 A1 * | 4/2007 | Nakagawa et al. | 123/406.27 |
| 2007/0119418 A1 | 5/2007 | Kojima et al. | |
| 2008/0236262 A1 | 10/2008 | Andrews | |
| 2009/0012694 A1 * | 1/2009 | Darr et al. | 701/102 |

FOREIGN PATENT DOCUMENTS

EP    1437492 B1    3/2006

* cited by examiner

*Primary Examiner* — Thomas Denion
*Assistant Examiner* — Patrick Maines
(74) *Attorney, Agent, or Firm* — Quarles & Brady LLP

(57) ABSTRACT

A method for regenerating a DPF in an exhaust aftertreatment system includes the steps of: monitoring a temperature of exhaust associated with a DOC; retarding an injection of fuel into at least one combustion cylinder, and thereby intentionally causing a misfire in the at least one combustion cylinder, dependent on the monitoring step; increasing an outlet temperature of the exhaust from the DOC to a first threshold temperature; and oxidizing particulates within the DPF when the exhaust is at the increased temperature. The number and/or frequency of the misfires is controlled to provide the desired exhaust temperature at the DPF inlet.

5 Claims, 2 Drawing Sheets

METHOD FOR REGENERATION OF DIESEL PARTICULATE FILTER IN AN EXHAUST AFTERTREATMENT SYSTEM OF AN IC ENGINE

FIELD OF THE INVENTION

The present invention relates to internal combustion engines, and, more specifically, to exhaust aftertreatment of such engines.

BACKGROUND OF THE INVENTION

An internal combustion (IC) engine in the form of a diesel engine has been used for commercial, industrial, agricultural and other heavy duty applications for well over 100 years. The fundamental diesel engine cycle promotes high part-power fuel efficiency and has therefore become the engine type of choice for commercial and agricultural purposes. Although the diesel engine has outstanding efficiency and long term durability, environmental issues have increased in significance with substantial increases in urban populations throughout the world. As a result, governmental regulations have become increasingly more stringent with respect to exhaust emissions from diesel engines. Nowhere is this more evident than in the United States, beginning with the Environmental Protection Agency (EPA) established over 30 years ago. During the ensuing years, the EPA has proposed and adopted ever increasing emissions limits for on-highway vehicles. The application of these standards has now been applied to off-road vehicles such as tractors, combines and other vehicles not normally driven on public highways including power generation systems. The EPA has adopted successive tiers of emissions requirements and the most recent is Tier IV. This requirement necessitates a diesel particulate filter (DPF) along with a requirement for regeneration of the filter to remove particulate matter accumulated on the filter.

A number of systems have been proposed to regenerate filters, relying on the fact that diesel particulate matter combusts when local temperatures are above 600° C. These systems may include engine management, resistive heating coils, microwave generation, and a fuel burner to increase the exhaust temperature. Another system is hydrocarbon injection in the form of atomized fuel directly into the exhaust upstream from a diesel oxidation catalyst (DOC) to increase the exhaust temperature around the filter. One of the problems with such a system is that the fuel nozzle and lines leading to the nozzle are subjected to high ambient temperatures reaching into the region where the hydrocarbon fuel tends to coke and form deposits in the fuel nozzle and associated supply passages.

SUMMARY OF THE INVENTION

The invention in one form is directed to a method for regenerating a DPF in an exhaust aftertreatment system. The method includes the steps of: monitoring a temperature of exhaust associated with a DOC; retarding an injection of fuel into at least one combustion cylinder, and thereby intentionally causing a misfire in the at least one combustion cylinder, dependent on the monitoring step; increasing an outlet temperature of the exhaust from the DOC to a first threshold temperature; and oxidizing particulates within the DPF when the exhaust is at the increased temperature. The number and/or frequency of the misfires is controlled to provide the desired exhaust temperature at the DPF inlet.

DETAILED DESCRIPTION OF THE INVENTION

Figure 1:
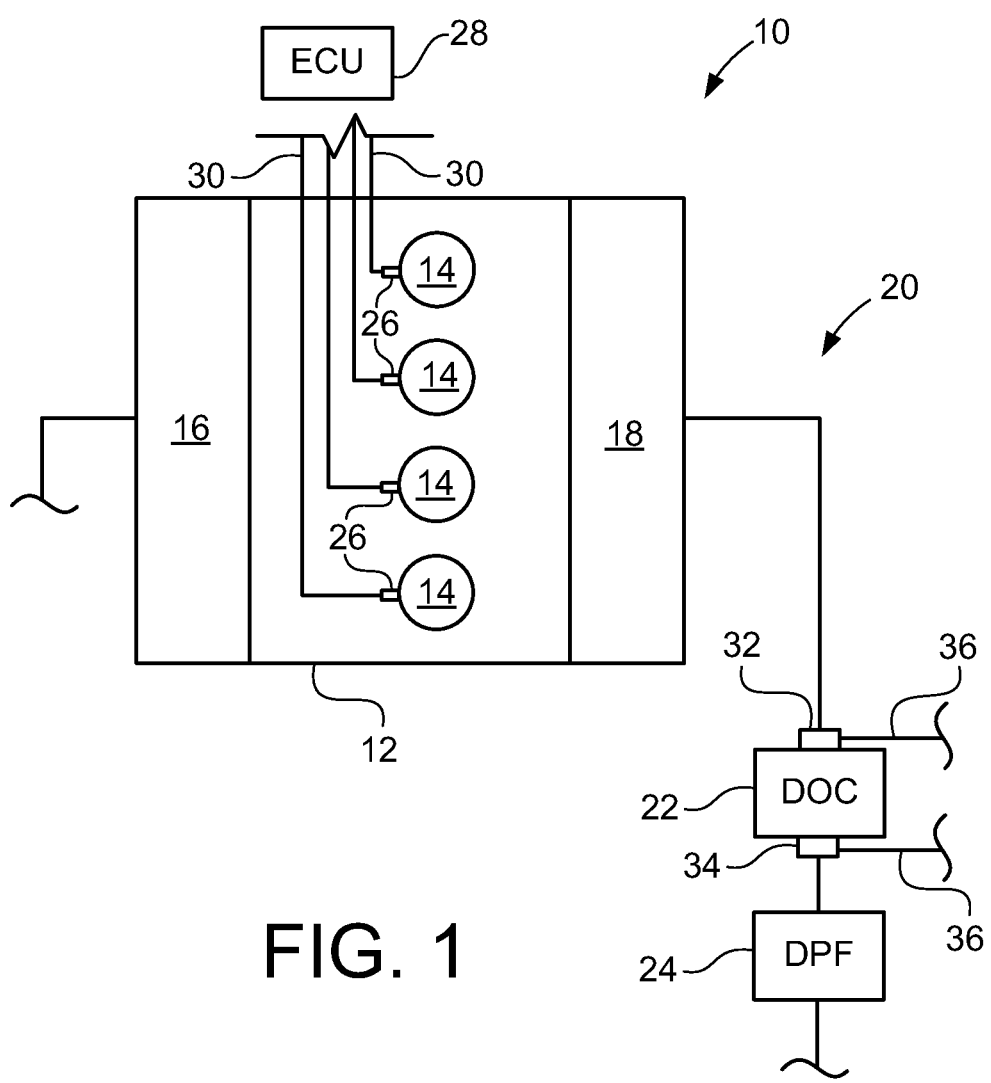
FIG. 1 is a schematic illustration of an IC engine which may be used for carrying out the method of the present invention for regenerating a DPF.

Referring now to the drawings, and more particularly to FIG. 1, there is shown an IC engine 10 in the form of a compression or diesel engine. IC engine 10 includes a block 12 defining a plurality of combustion cylinders 14. In the embodiment shown, block 12 includes 4 combustion cylinders 14, but could include a different number of combustion cylinders, such as 3, 6 or 8 combustion cylinders 14.

Each of the combustion cylinders 14 are in fluid communication with an intake manifold 16 and an exhaust manifold 18. Intake air is typically provided to intake manifold 16 in a pressurized manner, such as by using one or more turbochargers (not shown). Exhaust manifold 18 provides exhaust to an exhaust aftertreatment system 20, including DOC 22 and DPF 24. Exhaust aftertreatment system 20 may include other components as well, such as a selective catalytic reduction (SCR) system, etc (not shown).

Each combustion cylinder 14 is also associated with a respective fuel injector 26, which could be part of a conventional fuel injection system, such as a pump-line-nozzle fuel injection system or a common rail fuel injector system. The fuel injection system, including the plurality of fuel injectors 26, is under the control of an electronic or engine control unit (ECU) 28. To that end, each fuel injector 26 is coupled via a respective electric line 30 with ECU 28.

DOC 22, as described above under the Background section, is used to increase the temperature of the exhaust to approximately at least approximately 600° C. so that DPF 24 can be regenerated by oxidizing any particulate matter therein during a regeneration cycle. A first temperature sensor 32 is positioned at the inlet to DOC 22, and a second temperature sensor 34 is positioned at the outlet from DOC 22. Each of first temperature sensor 32 and second temperature sensor 34 are coupled with ECU 28 via a respective electric line 36.

Figure 2:
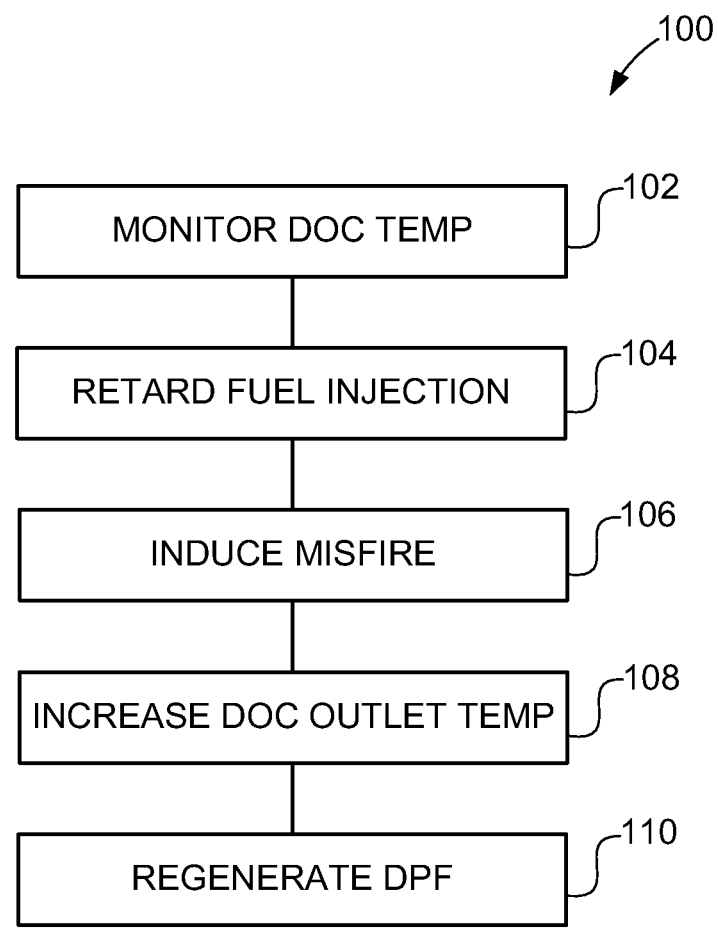
FIG. 2 is a flow chart of one embodiment of the method of the present invention for regenerating a DPF.

Referring now to FIG. 2, there is shown a flow chart of one embodiment of a method 100 of the present invention for regenerating DPF 24. During operation of IC engine 10, a temperature of exhaust associated with DOC 22 is monitored (block 102). This temperature is monitored using the temperature sensed with first temperature sensor 32 at the inlet to DOC 22. The temperature of the exhaust within the DOC 22 must be above a minimum threshold temperature, e.g., above approximately 250° C., so that the DOC 22 can oxidize any unburned fuel. The outlet temperature of the exhaust from DOC 22 may also be monitored using temperature sensor 34.

If it has been determined that a regeneration of DPF 24 is necessary, and if the monitored temperature of the DOC 22 is above a threshold temperature, e.g., 250° C., then the time at which a quantity of fuel is injected into one or more of the combustion cylinders 14 is retarded (block 104). Typically the injection timing is done with respect to a position of a piston (not shown) within a corresponding combustion cylinder 14 relative to a top dead center (TDC) position of the piston. The fuel injection timing is retarded to intentionally cause a misfire in the selected combustion cylinder(s), dependent on the monitoring of the DOC temperature and the retarding of the fuel injection described above (block 106). The number and/or frequency of misfires within the selected one or more combustion cylinder(s) is controlled, dependent on a quantity of fuel of each fuel injection, an exhaust inlet temperature to the DOC 22, and an exhaust outlet temperature from the DOC.

The intentionally caused misfires within the selected combustion cylinder(s) 14 results in unburned fuel being exhausted from the combustion cylinder(s). This unburned fuel mixes in the exhaust stream and is oxidized in the DOC 22, resulting in an increase in the outlet temperature of the exhaust from DOC 22 to a threshold temperature necessary for oxidation of particulate matter, e.g., soot, in DPF 24 (block 108). Typically, the threshold temperature for oxidation of particulate matter in DPF 24 is between approximately 550° C. to 650° C., preferably approximately 600° C. The exhaust gas exiting from DOC 22 at the elevated temperature flows through DPF 24 where particulates are oxidized for regeneration of DPF 24 (block 110).

Having described the preferred embodiment, it will become apparent that various modifications can be made without departing from the scope of the invention as defined in the accompanying claims.

The invention claimed is:

1. A method for regenerating a diesel particulate filter (DPF) in an exhaust aftertreatment system, said method comprising the steps of:

monitoring a temperature of exhaust associated with a diesel oxidation catalyst (DOC);

retarding an injection of fuel into at least one combustion cylinder, and thereby intentionally causing a misfire in said at least one combustion cylinder, dependent on said monitoring step;

increasing an outlet temperature of the exhaust from said DOC to a first threshold temperature; and oxidizing particulates within the DPF when the exhaust is at the increased temperature, wherein said step of intentionally causing a misfire in said at least one combustion cylinder is carried out to selectively control at least one of a number and frequency of misfires within said at least one combustion cylinder dependent on a quantity of fuel of each fuel injection, an exhaust inlet temperature to the DOC, and an exhaust outlet temperature from the DOC, wherein said step of intentionally causing a misfire in said at least one combustion cylinder is carried out if said monitored temperature of said DOC is above a second threshold temperature.

2. The method of regenerating a DPF of claim 1, wherein the second threshold temperature is 250° C.

3. The method of regenerating a DPF of claim 1, wherein said monitoring step includes sensing an inlet temperature to the DOC and sensing an outlet temperature from the DOC.

4. The method of regenerating a DPF of claim 1, wherein the first threshold temperature is between 550° C. to 650° C.

5. The method of regenerating a DPF of claim 4, wherein the first threshold temperature is 600° C.

* * * * *